Figure 1:
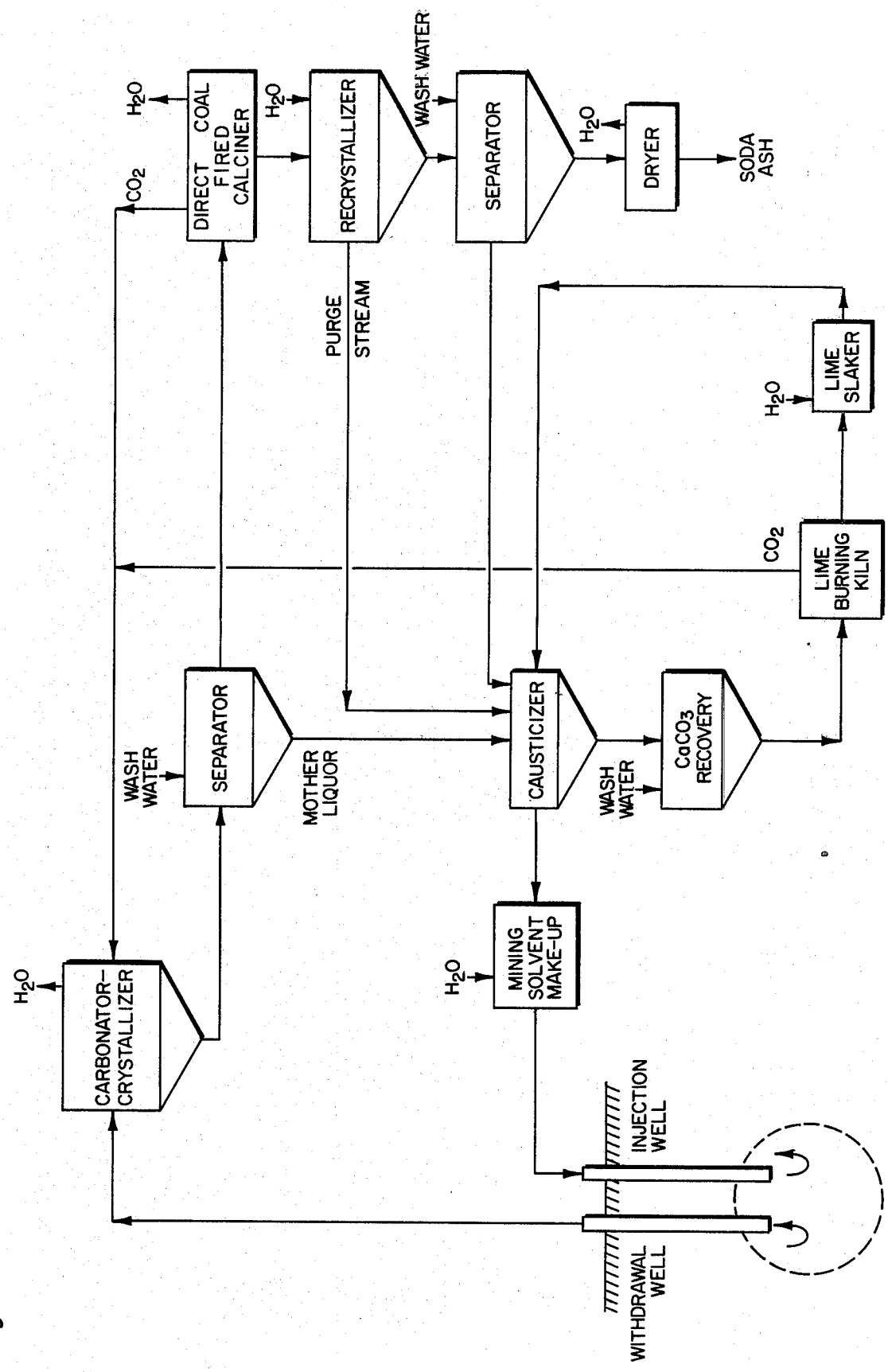

United States Patent [19]

Pinsky et al.

[11] 4,344,650

[45] Aug. 17, 1982

[54] RECOVERY OF ALKALI VALUES FROM TRONA DEPOSITS

[75] Inventors: Michael L. Pinsky, Mount Holly; John Walden, Hightstown, both of N.J.

[73] Assignee: FMC Corporation, Philadelphia, Pa.

[21] Appl. No.: 216,096

[22] Filed: Dec. 15, 1980

Related U.S. Application Data

[63] Continuation-in-part of Ser. No. 114,020, Jan. 21, 1980, abandoned.

[51] Int. Cl.³ .............................................. E21B 43/28
[52] U.S. Cl. ..................................... 299/4; 423/206 T
[58] Field of Search .................... 299/4, 5; 234/206 T

[56] References Cited

U.S. PATENT DOCUMENTS

| | | | |
|---|---|---|---|
| 3,119,655 | 1/1964 | Frint et al. ...................... | 423/206 T |
| 3,184,287 | 5/1965 | Gancy .............................. | 423/206 T |
| 3,498,744 | 3/1970 | Frint et al. ...................... | 423/206 T |
| 3,780,160 | 12/1973 | Waggener et al. ............. | 423/206 T |
| 3,953,073 | 4/1976 | Kube ................................ | 299/5 |
| 4,039,618 | 8/1977 | Gancy et al. ................... | 423/206 T |
| 4,285,915 | 8/1981 | Saldick et al. .................. | 299/5 X |
| 4,288,419 | 9/1981 | Copenhafer et al. ........... | 299/5 X |

Primary Examiner—Ernest R. Purser
Attorney, Agent, or Firm—George F. Mueller; Christopher Egolf

[57] ABSTRACT

A cyclic method for recovering alkali values from subterranean trona deposits. The ore is contacted via solution mining with an aqueous mining solvent containing sodium hydroxide, the resulting $Na_2CO_3$-containing solution is withdrawn and carbonated, and sodium sesquicarbonate and/or sodium bicarbonate is crystallized and separated from the solution. The crystallized solids are calcined in a direct coal-fired calciner, and the resultant anhydrous soda ash is recrystallized in water to form sodium carbonate monohydrate or anhydrous sodium carbonate, which is recovered as a dense alkali product. Aqueous mining solvent is regenerated by causticization of one or more of the various liquor streams, and the recovery cycle is repeated.

16 Claims, 2 Drawing Figures

RECOVERY OF ALKALI VALUES FROM TRONA DEPOSITS

This is a continuation-in-part of application Ser. No. 114,020, filed Jan. 21, 1980 and now abandoned.

This invention relates to the recovery of alkali values from deposits of trona ore whether or not containing appreciable proportions of sodium chloride. More particularly, the trona ore with or without associated sodium chloride is solubilized with an aqueous solvent containing sodium hydroxide and the alkali values contained in the extracting solution are ultimately recovered as substantially salt-free soda ash.

Most soda ash (sodium carbonate) produced in the United States is obtained from naturally-occurring subterranean trona ore deposits in Wyoming, which consist mainly of sodium sesquicarbonate, $Na_2CO_3.NaHCO_3.2H_2O$. At the present time, these trona deposits are mechanically mined and the trona converted to soda ash by either the sesquicarbonate process or the monohydrate process, whose features are summarized in U.S. Pat. No. 3,528,766.

Currently-employed soda ash processes utilize only those trona deposits which are recoverable by mechanical mining and which are relatively low in soluble, non-sesquicarbonate impurities, such as chlorides and sulfates. Large trona deposits exist in the same area which are associated with substantial amounts of sodium chloride, containing up to 10% or more by weight NaCl. The mined trona deposits presently being worked ordinarily contain less than 0.1% by weight sodium chloride, 0.04%–0.08% NaCl being typical. Soda ash has not previously been prepared from salt-containing Wyoming trona deposits because of the depth of the deposits, which precludes their being mechanically mined because of the undesirability of contending with the disposal of salt-laden byproduct liquors or large quantities of byproduct solid salt.

The salt-containing subterranean trona beds located in southwestern Wyoming constitute the world's largest known reserves of trona and have heretofore remained unexploited because of their substantial salt content.

The existence of problems associated with the presence of sodium chloride in trona deposits is evidenced by the fact that no salt-containing underground Wyoming trona deposits are being mined in commercial soda ash operations, as well as by the disclosures in U.S. Pat. Nos. 3,119,655 and 3,273,959 which relate to the dissolution of low salt (<0.1% NaCl) trona. In the prior art methods of these patents, an undesirable buildup of salt in the recycled process liquor used to dissolve low salt trona is avoided by bleeding and discarding a mother liquor purge stream. The virtual insolubility of trona as sodium sesquicarbonate in concentrated salt solutions at temperatures of from 20°–60° C. is another factor tending to discourage recovery of alkali values from salt-containing trona deposits.

The present invention provides an economical method of preparing a relatively pure soda ash product by utilizing an aqueous mining solvent to recover the alkali values from trona deposits regardless of the salt content of the ore deposit. Although solution mining techniques for exploiting trona ore deposits are disclosed in U.S. Pat. Nos. 3,184,287 and 3,953,073, neither of these prior art methods is directed to the preparation of a soda ash product from trona ore heavily contaminated with salt.

In accordance with the present invention, alkali values are recovered from underground trona ore deposits regardless of the sodium chloride content in a cyclic method which comprises introducing into the region of the trona deposit an aqueous mining solvent having dissolved therein from 2 to 7% by weight sodium hydroxide to effect dissolution of the trona ore as sodium carbonate and withdrawing from the region at least a portion of the resulting mining solution. The mining solution is carbonated with carbon dioxide so as to convert the dissolved sodium carbonate to sodium sesquicarbonate and/or sodium bicarbonate which is crystallized from the withdrawn solution, leaving in solution essentially all of the sodium chloride withdrawn from the region of the trona deposit, and the crystallized solid is separated from the mother liquor.

Soda ash is preferably recovered as the alkali product, from the crystallized sodium sesquicarbonate and/or sodium bicarbonate by calcination of the crystallized material in a direct fired coal calciner to form anhydrous sodium carbonate which is recrystallized as sodium carbonate monohydrate and subsequently heated to form dense soda ash.

In this cyclic method, water and sodium hydroxide are added to the mother liquor. The amounts of water and sodium hydroxide added are adjusted so as to result in a regenerated aqueous mining solvent containing from about 2 to 7% by weight sodium hydroxide and essentially all of the sodium chloride withdrawn from the region of the trona deposit. The water should be sufficient to compensate substantially for that of the volume of solvent left in the region of the trona deposit. The sodium hydroxide introduced to the mother liquor is preferably obtained by causticizing the residual sodium carbonate (or sodium bicarbonate) remaining dissolved in the mother liquor after crystallization. The make-up water may be added before and/or after causticization of the mother liquor.

The causticization of the mother liquor is preferably effected by a cyclic process wherein slaked lime and water are mixed with the mother liquor to convert the contained sodium carbonate into sodium hydroxide and calcium carbonate, which precipitates. The aqueous sodium hydroxide with or without dissolved sodium chloride and/or other chlorides and sulfates constitutes the mining solution. The recovered calcium carbonate precipitate is passed to a lime burning kiln wherein carbon dioxide is produced which is used in carbonating the mining solution withdrawn from the mine. The lime recovered from the kiln is slaked and the slaked lime used in causticizing the mother liquor.

The resulting regenerated aqueous mining solution is reintroduced into the region of the trona deposit, and the cycle of recovery is repeated.

Figure 2:
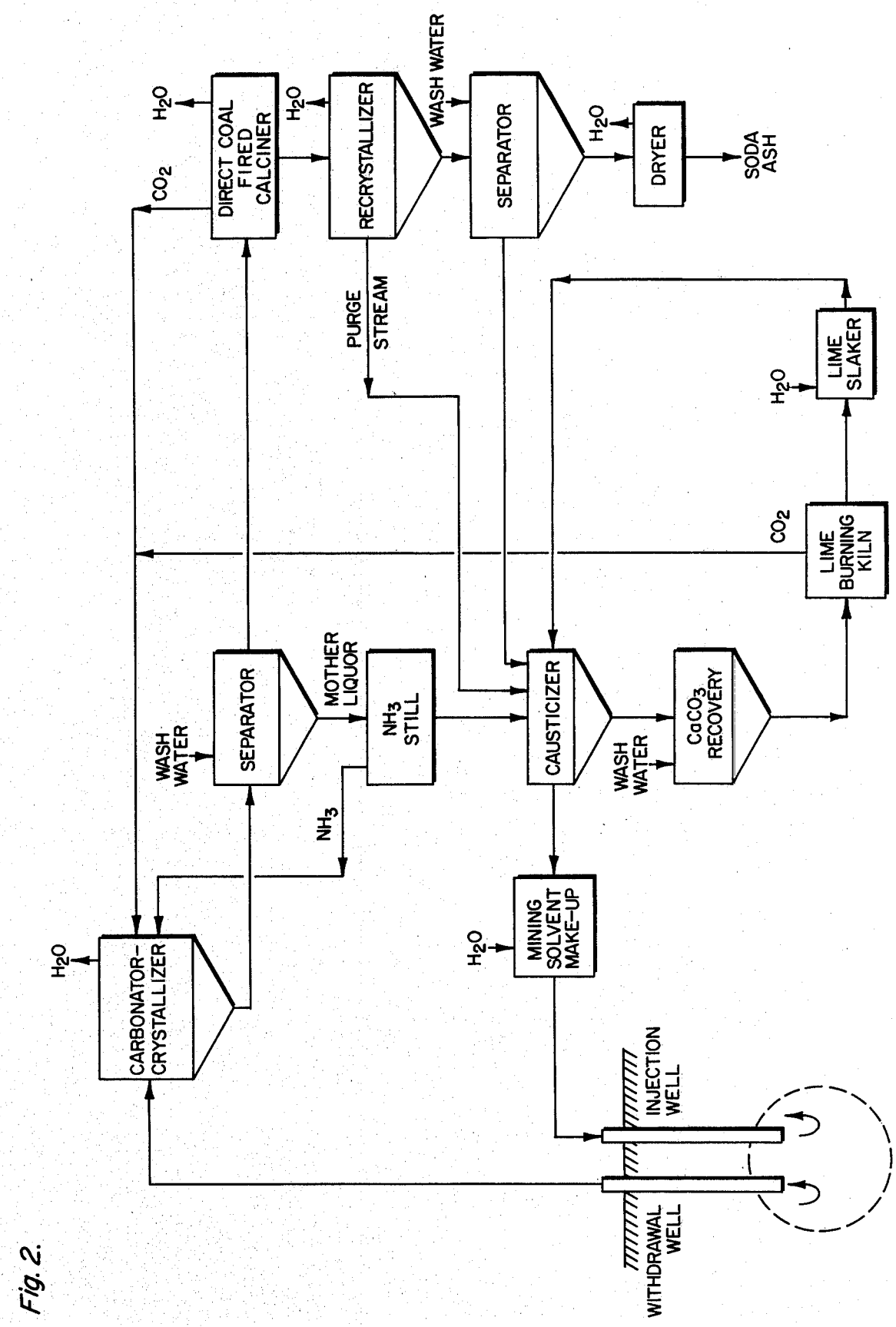

In the drawings:

FIG. 1 is a flowsheet depicting a preferred embodiment of the present method for the recovery of soda ash from an underground trona deposit; and FIG. 2 is a flowsheet depicting a modification of the method illustrating an alternative treatment of the withdrawn mining solution.

Suitable for treatment in accordance with the method of this invention are large trona deposits that exist in southeastern Wyoming whether or not the deposits are associated with substantial amounts or proportions of sodium chloride. Some salt-free trona deposits are located 1,600 feet or less below the surface and are presently mined by conventional mechanical mining methods without serious risk of roof collapse or cave-ins. The method of this invention is applicable to solvent mining of such deposits. The Wyoming deposits associated with appreciable amounts of salt are generally found in beds ranging from about 2,000 to 4,000 feet below the surface. These deposits are typically found in several beds interspersed over a formation thickness of from 400 to 600 feet. The beds of salt-containing trona are separated or interlayered with insoluble shale deposits, which deposits may also contain salt. The extreme depth of these beds precludes the use of conventional mechanical mining methods to recover the salt-containing trona.

Because the interlayered trona seams in the beds of salt-containing trona are thick, numerous, and relatively close together, the recovery of their alkali values is facilitated by the method of this invention, which employs an aqueous solvent introduced to the region of the trona deposits by solution mining techniques.

The sodium chloride associated with the trona varies in amounts and its degree of intermixture with the trona. It may simply be interlayered with trona or may be intimately intermingled with the trona. Deposits of trona containing 3% by weight sodium chloride up to 10% by weight NaCl, or more, are considered to be associated with substantial amounts of salt, and the method of this invention is suited to the recovery of alkali values from such salt-containing trona. Recovery of only the trona without concurrent recovery of the salt, either by mechanical mining or solution mining, has heretofore not been feasible using conventional techniques.

The various aspects of the method of this invention may be broadly categorized as either underground or surface operations. The underground, or subterranean, operations involve the introduction of an aqueous mining solvent into contact with the trona ore and its associated sodium chloride.

After the aqueous mining solvent has been maintained in contact with the trona ore and its associated sodium chloride, if present, for a period of time sufficient to solubilize at least a portion of the trona as sodium carbonate, the resulting mining solution is withdrawn from the region of the underground trona deposits and subjected to the surface operations.

The surface operations involve processing of the sodium carbonate-containing mining solution to recover the alkali values contained in it and are described in detail following the description of the underground operations.

The aqueous mining solvent employed in the method of this invention ordinarily will contain from 2 to 7% by weight sodium hydroxide, preferably from 3 to 5.5% by weight NaOH, and more preferably from 3 to 4% by weight NaOH.

The aqueous mining solvent, when used in an embodiment of the invention in the solution mining of trona associated with substantial amounts of sodium chloride and which involves regeneration and recycle of the solvent, will ordinarily contain the requisite sodium hydroxide and from 5 to 15% by weight sodium chloride and possibly small amounts of sodium carbonate in concentrations up to 3% by weight. The sodium carbonate concentration in the aqueous mining solvent is desirably minimized since the presence of carbonate in the solvent diminishes its capacity to solubilize trona as sodium carbonate; it is preferably less than 1% by weight $Na_2CO_3$.

The recycled aqueous mining solvent may contain, in addition to the components noted above, other soluble impurities normally associated with trona ore in small amounts. However, soluble impurities such as sulfates, borates and phosphates that are generally found in trace amounts in trona do not accumulate in appreciable concentrations in the regenerated and recycled aqueous mining solvent.

The temperature of the aqueous mining solvent introduced into the region of the subterranean trona ore deposits is not critical. Solvent temperatures of from 20° to 80° C. are satisfactory, with 30° to 50° C. being preferred. Solvent temperatures above the preferred 50° C. and even above 80° C. are feasible but less practical because of the increased solubility of salt and decreased solubility of sodium carbonate at such temperatures and because of the energy costs required.

Introduction of an aqueous mining solvent having a temperature around ambient, about 20°-30° C., will not result in significant heat losses underground. Trona deposits associated with salt that are 2,000 feet below the surface, a representative depth for salt-containing trona deposits in southwestern Wyoming, generally have a ground temperature of about 25° C., and the ground temperature increases for deeper deposits.

The aqueous mining solvent is desirably prepared directly or indirectly from withdrawn mining solution, but may also be obtained by introduction of sodium hydroxide to an aqueous solution to obtain the requisite sodium hydroxide concentration.

Upon startup of the cyclic embodiment of this invention, an aqueous solution containing the proper sodium hydroxide concentration may be employed as the initial aqueous mining solvent until sufficient solvent can be regenerated from withdrawn mining solution, as described below.

In a preferred procedure for preparing an aqueous mining solvent, mother liquor, obtained after recovery of the alkali values from the withdrawn mining solution by crystallization and separation of the product crystals from the liquor, is treated to prepare an aqueous mining solution. Sodium hydroxide may be introduced into the mother liquor either by addition of caustic soda or by causticization with lime of residual sodium carbonate dissolved in the mother liquor. An alternative to this preferred procedure involves causticizing a diverted portion of the withdrawn mining solution, which contains an appreciable concentration of sodium carbonate, either before or after the addition of dilution water, to convert its sodium carbonate content to sodium hydroxide.

The aqueous mining solvent is desirably introduced into the region of the underground trona deposits by means of one or more wells using conventional solution mining techniques. A single solution mining well ordinarily has an injection pipe and withdrawal pipe. Separate injection and withdrawal wells may be used, the two types desirably being spaced apart, located from a few hundred to one thousand feet apart, and being connected via underground fractures in the trona formation through which the aqueous mining solvent may pass.

Introduction of the aqueous mining solvent to the region of a salt-containing trona ore deposit results in the formation of a solution which contain both sodium carbonate and sodium chloride. The concentrations of sodium carbonate and sodium chloride in the withdrawn mining solution depend on the amount of salt associated with the trona and on the residence time, the period over which the mining solution is in contact with the trona. The sodium concentration will ordinarily be less than a saturated salt solution for trona associated with about 3% by weight NaCl, but will typically approach saturation if the trona has 10% or more by weight NaCl associated with it.

The aqueous mining solvent must be maintained in contact with the trona ore for a sufficient period of time to allow for solubilization of at least a portion of the sodium sesquicarbonate, preferably resulting in a solution which has reached 50% of the theoretically obtainable saturation concentration with respect to the ore. More preferably, the residence time, the period over which the mining solvent is maintained in contact with the trona ore, is sufficient for the withdrawn mining solution to reach at least 70-80% or more of saturation with respect to the ore.

Solubilization of sodium chloride by the mining solvent, it should be noted, is ordinarily much more rapid than that of the sodium sesquicarbonate.

A fully saturated mining solution ordinarily will contain approximately 12 to 25% by weight sodium carbonate at temperatures between 20° C. to 40° C. For saturated solutions, as the concentration of sodium carbonate increases from 12 to 25% by weight, the corresponding concentration of sodium chloride will decrease, being in the range 15 to 5% by weight NaCl, for temperatures between 20° C. to 40° C. The withdrawn mining solution desirably contains from 17 to 21% by weight $Na_2CO_3$.

The mining solution which is ultimately withdrawn from the trona cavity typically will contain minimal sodium bicarbonate from the solubilized sodium sesquicarbonate, not more than 2% by weight $NaHCO_3$.

The aqueous mining solvent is believed to overcome the marginal solubility of trona in salt solutions through the reaction of the sodium hydroxide in the solvent with sodium sesquicarbonate to form soluble sodium carbonate. Both sodium sesquicarbonate and sodium bicarbonate are only slightly soluble in concentrated salt solutions; over the temperature range of 20° C. to 60° C., the concentration of trona in a 20% by weight NaCl solution is less than 2% by weight $Na_2CO_3 \cdot NaHCO_3 \cdot 2H_2O$. The presence of the sodium hydroxide in the aqueous mining solvent results in the chemical conversion of trona to sodium carbonate, with the resulting sodium carbonate-salt solution containing very little dissolved sodium bicarbonate or sodium sesquicarbonate because of its high sodium chloride and sodium carbonate content.

The equilibrium concentration of sodium chloride in the mining solution ordinarily remains relatively constant in the cyclic method of this invention. This concentration of salt in the sodium carbonate-containing mining solution will be less than a saturation level whenever the amount of salt associated with the trona deposit is insufficient to provide salt-saturation in the volume of solvent which is left behind in the cavity.

Amounts of sodium chloride associated with the trona ore which do provide sufficient salt to yield a mining solution saturated with salt do not adversely affect the method of this invention. Excess sodium chloride will remain undissolved in the region of the trona deposits and/or will precipitate from the salt-saturated mining solution while still in the region of the trona deposits. Although a salt redistribution within the region of the underground trona cavity may well occur, sodium chloride need not be precipitated or produced as a solid byproduct during the surface operations to recover the alkali values from the withdrawn salt-saturated mining from the withdrawn salt-saturated mining solution.

The dissolution of the trona via its reaction with sodium hydroxide results in the release of water of hydration from the trona, which dilutes the aqueous mining solvent and may improve slightly the dissolving rate of the trona.

The solubility of sodium carbonate in mining solution saturated with salt is highest at temperatures of from 20°-35° C. and is between 15% to 20% by weight $Na_2CO_3$. The salt saturation concentration of such carbonate solutions increases as the temperature is increased, and sodium carbonate saturation concentration decreases. Sodium carbonate solubility in salt-free mining solutions, on the other hand, is relatively unaffected by solution temperature. It is therefore desirable to maintain the temperature of the withdrawn mining solution within the temperature range of 20°-35° C. so as to provide for maximum possible alkali value recovery from the withdrawn solution.

If desired, the incoming aqueous mining solvent may be employed in a heat exchanger to warm the withdrawn mining solution sufficiently to render it unsaturated with respect to its sodium chloride content. Alternatively, a small amount of incoming aqueous mining solvent, or other aqueous solution, may be introduced as diluent into the withdrawn mining solution to minimize the likelihood of salt precipitation during surface transport of the solution to the processing location.

Temperatures of from 20°-35° C. for the withdrawn mining solution are preferred and are facilitated by the fact that ground temperatures of underground salt-containing trona deposits in southwest Wyoming at depths of 2,000 or more feet are above 25° C. Furthermore, the reaction of the sodium hydroxide in the aqueous mining solvent with sodium bicarbonate is mildly exothermic and thus provides a source of localized heating which maintains the desired temperature as well as promoting via convective circulation a more rapid dissolution of the sodium sesquicarbonate.

At least a portion of the aqueous mining solvent that is introduced into the region of the trona deposits is withdrawn as mining solution, after solubilization of the sesquicarbonate in the trona as sodium carbonate, having a composition and characteristics as noted above. It should be apparent that recovery of mining solution in an amount or rate equivalent to the amount or rate of solvent introduced may not be feasible in a continuous, sustained operation. It is estimated that approximately one-tenth of the introduced solvent will remain behind in the cavity left by dissolved trona since such solvent replaces dissolved trona which is withdrawn in the mining operation. The contribution of the water from the hydrated water of the dissolved sodium sesquicarbonate and as a byproduct of the sodium hydroxide-sodium bicarbonate reaction does not appreciably offset these losses of mining solvent which replaces dissolved trona.

For these reasons, the aqueous mining solvent desirably should have a low NaOH concentration, containing up to about 5.5% NaOH. The amount or rate of mining solution withdrawal preferably corresponds to the amount or rate of solvent introduced, after solvent losses from replacing dissolved trona are taken into account.

By operating in this preferred fashion, the solution mining of trona ore deposits with an aqueous mining solvent containing the preferred 3 to 5.5% by weight NaOH can result in about 0.2 lb. $Na_2CO_3$ per pound of solvent being withdrawn from the ground. Subsequent surface treatment operations can provide for recovery of up to 70% of the sodium carbonate content of this mining solution. The balance of the sodium carbonate is preferably converted to sodium hydroxide for reintroduction, after addition of make-up water, as regenerated aqueous mining solvent to the region of the salt-containing trona deposits.

The mining solution withdrawn from the area of the trona deposits may be subjected to various operations to utilize or recover the alkali values from the salt- and sodium carbonate-containing solution. The alkali values are preferably recovered by crystallization of at least a portion of the sodium carbonate dissolved in the withdrawn mining solution, leaving in solution essentially all of the dissolved sodium chloride.

The operations involved in the treatment of the withdrawn mining solution to recover sodium sesquicarbonate and/or sodium bicarbonate, and ultimately soda ash, are depicted in the flow diagrams shown in the drawings.

The mining solution withdrawn from the region of the trona deposit is carbonated by the introduction of carbon dioxide so as to convert the major proportion of the sodium carbonate to sodium sesquicarbonate and/or sodium bicarbonate, as in the CARBONATOR-CRYSTALLIZER shown in the drawings and wherein the sesquicarbonate and/or bicarbonate are crystallized without coprecipitation of sodium chloride, if present, and other chloride and sulfate impurities. Carbonation may be effected at a temperature of from 10° to 70° C., preferably 30° to 50° C.

In an alternative processing of the withdrawn mining solution, crystallization and precipitation of the sodium sesquicarbonate and/or sodium bicarbonate may be facilitated by introducing ammonia in the CARBONATOR-CRYSTALLIZER, as illustrated in FIG. 2. The ammonia is effective in salting-out these alkalis and may be introduced by the use of conventional gas-liquid mixing equipment. After separation of the crystallized material, the ammonia may be recovered from the mother liquor by distillation ($NH_3$ STILL), FIG. 2. The recovered ammonia may be recycled to the CARBONATOR-CRYSTALLIZER.

The precipitated crystallized sodium sesquicarbonate and/or sodium bicarbonate is separated from the mining solution in a SEPARATOR, as illustrated in the drawings. The SEPARATOR may consist of a centrifuge or gravity separator and filter or other conventional solid-liquid separation equipment. The separated crystals may be washed with water, the wash water being added to the mother liquor. Additional water may be added to the mother liquor so as to prevent precipitation of sodium chloride in subsequent operations involving the mother liquor.

The recovered sodium sesquicarbonate and/or sodium bicarbonate is calcined as in a DIRECT COAL FIRED CALCINER wherein the crystallized material becomes converted into anhydrous sodium carbonate. The heat required for the conversion of the crystalline material in the direct coal fired calciner is obtained by passing the products of combustion directly into contact with the crystalline material. The resulting anhydrous sodium carbonate will contain small proportions of such contaminants as chlorides, sulfates, phosphates and borates originating from the trona deposit and various water-soluble and water-insoluble contaminants resulting from direct contact of the products of combustion with the crystalline material. In addition, carbon dioxide and water vapor are evolved. The carbon dioxide may be recovered for use in carbonation of the withdrawn mining solution, if desired.

The contaminated anhydrous sodium carbonate is purified by recrystallization in water as in a RECRYSTALLIZER to form sodium carbonate-containing crystals while maintaining a constant purge of the aqueous liquor. The aqueous purge liquor contains some dissolved sodium carbonate and the major proportion of soluble and insoluble impurities. The conditions maintained during recrystallization determine the type of sodium carbonate-containing crystals which are produced during this procedure. Sodium carbonate monohydrate crystals may be produced at atmospheric pressure and maintaining the temperature during recrystallization at about 80° to 100° C. By conducting the recrystallization at a temperature of about 110° C. and at a corresponding super-atmospheric pressure the crystallized material will consist of anhydrous sodium carbonate. In both procedures the precipitated product consists of substantially impurity-free sodium carbonate-containing crystals.

The recrystallization of the contaminated anhydrous sodium carbonate generally does not require the expenditure of large amounts of energy. The contaminated anhydrous sodium carbonate is merely recrystallized in water into relatively uncontaminated sodium carbonate-containing crystals, and since only a phase reversion occurs in this operation, there is not a significant consumption of energy involved.

The purified sodium carbonate-containing crystals thus produced are separated from the aqueous liquor, as in a SEPARATOR as illustrated in the drawings. If desired, the separated crystals may be washed with water. The above aqueous liquor from this separation step, which itself may serve as the purge, and from the washing step if used, contains some sodium carbonate, dissolved impurities and may include some insoluble contaminants. The recovered sodium carbonate-containing hydrated crystals are dried as in a DRYER wherein water is driven off and the sodium carbonate-containing crystals are converted into a dense soda ash.

Although the drawings, for illustrative purposes, indicate a purge coming directly from the RECRYSTALLIZER, the liquor obtained during separation of the recrystallized sodium carbonate-containing crystals may function as the sole purge. Alternatively, the liquors obtained both during recrystallization and during separation may constitute the purge.

The mother liquor obtained from the initial crystallization and the aqueous liquors obtained during recrystallization and separation of the recrystallized crystals contain dissolved sodium carbonate. Desirably, one or more of these liquors are regenerated to form the aqueous mining solution for recycling to the region of the trona deposit. If desired, one or more of these liquors may be combined. For illustrative purposes, the three streams are combined in the CAUSTICIZER. Regeneration may be effected by introducing sodium hydroxide, either by direct addition of sodium hydroxide and/or by causticizing the sodium carbonate in the liquors to form sodium hydroxide. Causticization of the combined liquors is preferred, as illustrated (CAUSTICIZER) in the drawings.

Alternatively, or if required to obtain the required sodium hydroxide concentration for the mining solvent, a portion of the withdrawn mining solution may be diverted and its sodium carbonate content causticized. The causticized diverted mining solution may then be added to the combined liquors to produce the mining solvent. In any event, water may also be added (MINING SOLVENT MAKE-UP) to provide the required caustic concentration and volume of the mining solvent.

The sodium hydroxide solution is prepared preferably by causticizing the combined liquors with lime in a cyclic procedure, as shown in the drawings, based on the lime-soda process. The lime-soda process, being well known in the art, need not be described in detail. The combined liquors are treated (CAUSTICIZER) with sufficient amounts of slaked lime to convert all or most of the contained sodium carbonate to sodium hydroxide.

The reaction also produces a precipitate of calcium carbonate as a byproduct. The calcium carbonate precipitate is recovered from the treated solution by thickening-clarifying, washing and filtration operations which comprise the calcium carbonate recovery ($CaCO_3$ RECOVERY) by a conventional lime-soda process. The calcium carbonate filter cake is then burned in a lime kiln (LIME BURNING KILN) to form calcium oxide followed by a hydration step (LIME SLAKER) to form slaked lime. The lime, generally in the form of a 20% slurry prepared with water, wash liquors and/or mother liquor, is used to causticize additional combined liquors or mining solution. The $CO_2$ gas resulting from the lime burning step may be recovered and used to carbonate the withdrawn mining solution as illustrated in the drawings.

The causticized liquor is then treated with make-up water as shown (MINING SOLVENT MAKE-UP) in the drawings to adjust the causticized liquor to the desired sodium hydroxide concentration. The make-up water may include wash water from one or more of the crystal washes. A substantial portion of the water added to provide the mining solution serves to replace water losses occurring during crystallization and product recovery and to compensate for mining solvent which remains in the underground cavity replacing dissolved trona. The water losses during crystallization may occur from moisture losses during separation of the damp crystals from the mother liquor. Also, the formation of sodium sesquicarbonate accounts for some water loss.

The resulting regenerated mining solvent is reintroduced, as shown in the drawings (INJECTION WELL), to the region of the trona deposits as previously described.

We claim:

1. A method for recovering alkali values from underground trona deposits which comprises
   (i) introducing into the region of the trona deposit an aqueous mining solvent having dissolved therein from about 2 to 7% by weight sodium hydroxide;
   (ii) maintaining the solvent in the region for a period sufficient to solubilize at least a portion of the trona as sodium carbonate;
   (iii) withdrawing from the region at least a portion of the resulting mining solution;
   (iv) carbonating at least a portion of the withdrawn mining solution to convert the major portion of the sodium carbonate contained therein into sodium sesquicarbonate and/or sodium bicarbonate;
   (v) crystallizing the sodium sesquicarbonate and/or sodium bicarbonate;
   (vi) separating the crystallized solids from the mining solution mother liquor;
   (vii) calcining the crystallized solids in a direct coal fired calciner to form anhydrous sodium carbonate contaminated with impurities;
   (viii) recrystallizing the contaminated anhydrous sodium carbonate in water to form sodium carbonate-containing crystals while the contaminants remain in the aqueous liquor;
   (ix) separating purified sodium carbonate-containing crystals from the aqueous liquor containing contaminants;
   (x) maintaining an aqueous purge of liquor containing said contaminants;
   (xi) adding sodium hydroxide and water to at least one of said liquors, the amounts of sodium hydroxide and water being adjusted so as to form an aqueous mining solvent containing from about 2 to 7% by weight sodium hydroxide; and
   (xii) reintroducing the resulting aqueous mining solvent into the region of the trona deposit and repeating the cycle of recovery.

2. The method of claim 1 wherein the mining solvent contains from 3 to 5.5% sodium hydroxide.

3. The method of claim 1 wherein step (viii) is conducted under conditions to form sodium carbonate monohydrate as the sodium carbonate-containing crystals.

4. The method of claim 1 wherein step (viii) is conducted at atmospheric pressure and at a temperature between 80° C. and 100° C. to form sodium carbonate monohydrate as the sodium carbonate-containing crystals.

5. The method of claim 1 wherein step (viii) is conducted under conditions to form anhydrous sodium carbonate as the sodium carbonate-containing crystals.

6. The method of claim 1 wherein step (viii) is conducted under superatmospheric pressure and at a temperature of at least about 110° C. to form anhydrous sodium carbonate as the sodium carbonate-containing crystals.

7. The method of claim 1 wherein the separated aqueous liquor in step (ix) serves as the aqueous purge liquor containing the contaminants.

8. The method of claim 1 wherein the aqueous liquor in step (viii) serves as the aqueous purge liquor containing the contaminants.

9. The method of claim 1 wherein sufficient water is added in step (xi) to compensate substantially for water losses and for the volume of solvent left in the region of the trona deposit.

10. The method of claim 1 wherein the sodium hydroxide in step (xi) is added by causticizing the selected liquor or liquors with lime.

11. The method of claim 1 wherein in step (xi) at least one of the separated liquors is treated with lime to convert the contained sodium carbonate into sodium hydroxide and calcium carbonate, to provide the required sodium hydroxide, the calcium carbonate is separated from the treated liquor, the recovered calcium carbonate is burned in a kiln to form said lime and carbon dioxide and at least a portion of said carbon dioxide is used as the carbonating agent in step (iv).

12. The method of claim 1 wherein the trona deposit is associated with substantial amounts of sodium chloride.

13. The method of claim 1 wherein the carbonation of step (iv) is effected by introducing carbon dioxide into the mining solution.

14. The method of claim 1 wherein ammonia is introduced in step (v).

15. The method of claim 1 wherein ammonia is introduced in step (v), the mother liquor of step (vi) is distilled to recover ammonia and the ammonia is introduced in step (v).

16. The method of claims 1, 3 or 4 wherein the purified sodium carbonate-containing crystals are dried to form dense soda ash.

* * * * *